(12) United States Patent
Maguire

(10) Patent No.: US 8,092,894 B1
(45) Date of Patent: Jan. 10, 2012

(54) HIGH STRENGTH POLYMERICS

(75) Inventor: John F. Maguire, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 772 days.

(21) Appl. No.: 12/152,125

(22) Filed: May 5, 2008

(51) Int. Cl.
*B32B 5/00* (2006.01)
*B32B 7/00* (2006.01)
*B32B 5/14* (2006.01)

(52) U.S. Cl. .......................... 428/98; 428/357; 442/202

(58) Field of Classification Search .................... 428/98, 428/292, 357
See application file for complete search history.

(56) References Cited

U.S. PATENT DOCUMENTS 4,725,490 A * 2/1988 Goldberg ...................... 442/202
* cited by examiner

*Primary Examiner* — Brent Ohern
(74) *Attorney, Agent, or Firm* — AFMCLO/JAZ; Fredric Sinder

(57) ABSTRACT

Provided is a method for making strong load-bearing plastics which includes, forming a mixture of magnetically tagged, electrically tagged, and untagged polymeric rods and flowing the mixture of the three types of rods through a forming tool across which, electric and magnetic fields are applied, to form a plastic article or structure with 3-D orientation of the molecules therein and thus a product of high strength in 3 dimensions.

2 Claims, 2 Drawing Sheets

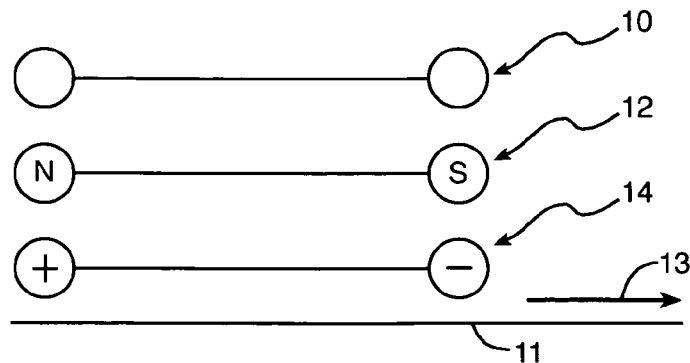
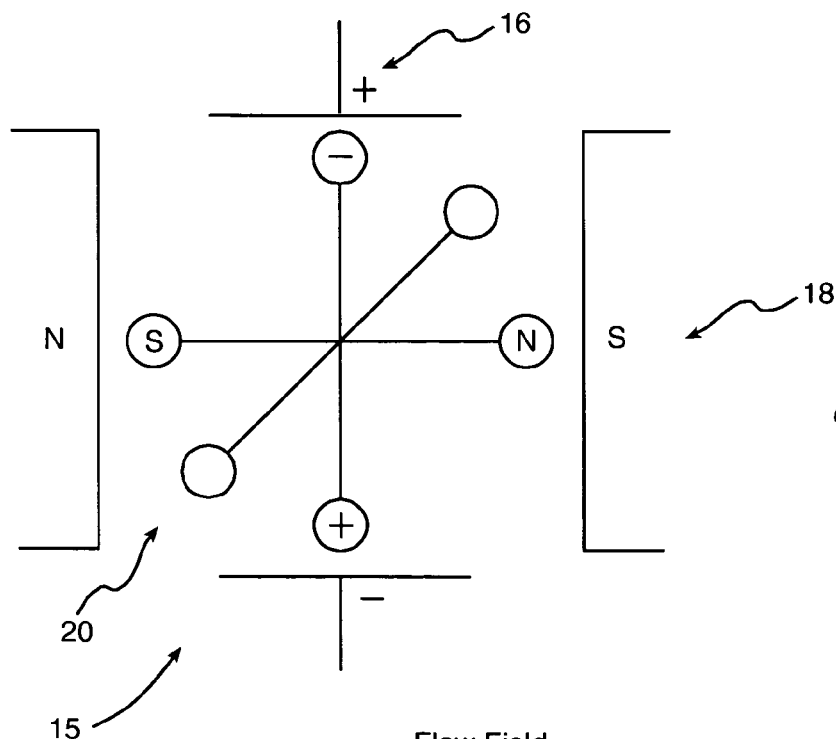
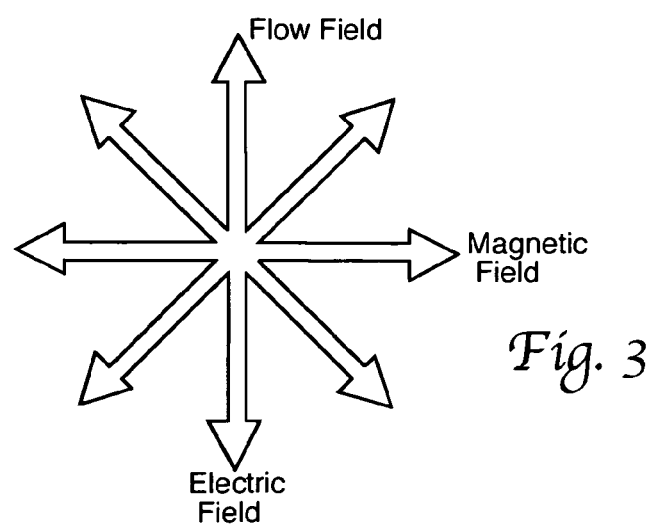
Fig. 1
Fig. 2
Fig. 3

Final Part

HIGH STRENGTH POLYMERICS

STATEMENT OF GOVERNMENT INTEREST

The invention described herein can be manufactured and used by or for the Government for governmental purposes without the payment of any royalty thereon.

CROSS-REFERENCE TO RELATED APPLICATIONS

None.

FIELD OF THE INVENTION

This invention relates to a method for processing polymeric material, particularly one which results in products of high strength and durability and the products so formed.

BACKGROUND OF THE INVENTION

It is common practice to make all kinds of components and products from "plastics" using a variety of high-rate low-cost molding (injection, blow-molding and the like.) technologies. These objects can be fabricated at low labor costs but can have high dimensional tolerance, finish and the like. Examples range from all sorts of toys (GI Joe and Barbie Dolls) through all sorts of appliances, household goods, furniture and the like. The big advantage of plastic is that it can be manufactured at exceedingly low costs and has ubiquitous application when structural integrity is not required. The big disadvantage of monolithic thermoplastics is that they have low strength and stiffness and cannot be used for load-bearing structural applications. Advanced composites overcome this shortcoming by laminating reinforcing fibers into a polymeric matrix. There are three major disadvantages with advanced composites. First, the lamination process is highly labor intensive, not well suited to automation and results in components that are more expensive to produce that their metal equivalents. Second, reinforcement is achieved in essentially only two dimensions. Finally, high dimensional tolerance is hard to achieve and maintain leading to substantial fit-up, shimming and the like and high assembly (bonding and joining) costs. There is a clear and compelling need to develop technology that can produce structural components with high dimensional tolerance and finish at low manufacturing costs.

The above problems are well known and can be summarized as high manufacturing costs, mostly labor, not amenable to automation and the material is often sticky and disorderly in the lay-up stage. Also the mechanical fit-up for joining parts can be difficult and expensive. That is, it is estimated that 60% of manufacturing costs are incurred in joining components for major assemblies and subassemblies.

Thus, there is need and market for technology to produce large polymer articles of high strength in 3 dimensions, with good dimensional tolerance, so as to overcome the above prior art shortcomings.

There has now been discovered a method to make the above components and structures of polymeric material and yet be of surpassing strength in 3 dimensions.

SUMMARY OF THE INVENTION

Broadly, the present invention provides, a method for making strong load-bearing plastics which includes, forming a mixture of magnetically tagged, electrically tagged, and untagged polymeric rods and flowing the mixture of the three types of rods through a forming tool across which electric and magnetic fields are applied, to form an article or structure with 3-D orientation of the molecules therein due to application of electric, magnetic and flow fields and thus a product of high strength in 3 dimensions.

The invention also provides a method for making durable polymeric articles in which portions thereof are oriented in 3 dimensions, which invention also includes the polymeric products so made, including those products with 3-D dimensional strength and stiffness, reminiscent of metal.

The invention also provides a high-strength plastic article having 3-D orientation of plastic molecules therein.

DEFINITIONS

By polymerics or polymeric material, as used herein, is meant a material that has been synthesized chemically by combining a number of similar chemical units (monomers) to form a molecule of much greater molecular weight.

By polymeric rod, as used herein, is meant a polymeric molecule of sufficient stiffness and length to have a sufficient turning moment to achieve the desired orientation or degree of alignment herein. The degree of molecular alignment is governed by the polymeric flow rate and the magnitude and direction of the magnetic and/or electric moments which, in turn, depend on the length of the molecule.

The polymeric rods discussed herein can include PBO, PBZT, PBLG and PHIC. Such rods can be chemically treated on their ends with organometallic functional groups, including those containing cobalt, iron, manganese, nickel, platinum and nanoparticles containing these elements, to be susceptible to alignment in a magnetic field and can be treated on their ends with anions, cations and charged nanoparticles, to be susceptible for an alignment in an electric field. And the size of such rods can be 10 nm to 10000 nm in length, per the invention.

The types of forming tools to be employed with the method of the present invention, can vary and can, in addition to an injection mold, be a resin transfer mold, an autoclave mold and the like.

The strength of the magnetic field employed herein, can be 1 to 100 K gauss and of the electric field can be 100 to 10000 Volts per meter as employed with the method of the present invention.

The flow rate of the mixture, as it moves in the molding tool, through the electric and magnetic fields, per the invention, is suitably 0.01 to 100 inches per second and preferably one inch per second.

By PBO, PBZT, PBLG and PHIC is meant poly (paraphenylene-2,6-benzobisoxazole), poly (paraphenylene-2,6-benzobisthiasole), poly(gamma-benzyl-L-glutamate) and poly (n-hexyl isocyanate) respectively.

BRIEF DESCRIPTION OF THE DRAWINGS

The invention will become more apparent from the following detailed specification and drawings in which;

FIG. 1 is a schematic view of 3 types of polymeric rods with unidirectional orientation and flow;

FIG. 2 is a fragmentary, schematic view of the rods of FIG. 1 as they undergo multidirectional orientation per the invention;

FIG. 3 is a vector diagram of the multidirectional orientation of FIG. 2;

DESCRIPTION OF PREFERRED EMBODIMENTS

Figure 4:
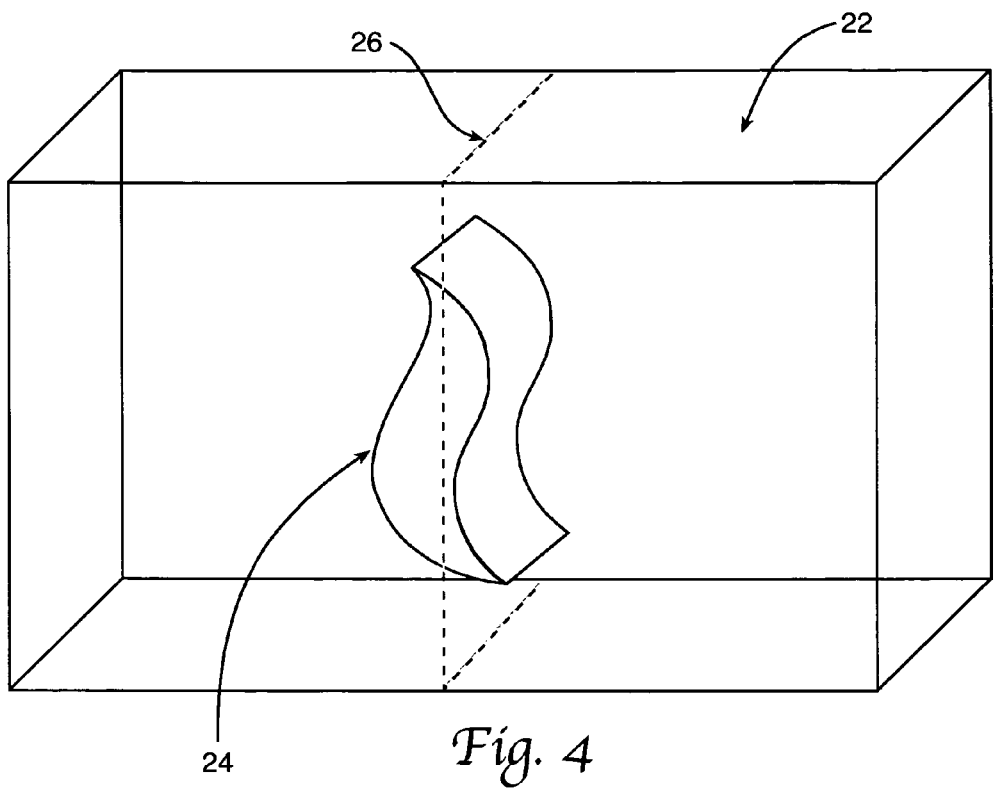
FIG. 4 is an isometric schematic view of a polymeric product formed, per the method of FIGS. 2 and 3, in a transparent chamber

Referring in more detail to the drawings, the material system is formulated using engineered components with well-defined molecular structure. These units, shown schematically in FIG. 1, can be rods of oligomers, or polymers, and are synthesized with neutral end-groups 10, magnetically susceptible end-groups 12 and/or electrically susceptible (ionic) end-groups 14. Each of these components is synthesized from chemical backbones that are similar, when miscibility of the components is required or from dissimilar polymeric backbones, if any degree of immiscibility or a two-phase system is required.

The neutral rod 10 is an example of an untagged molecule of the prior art and as it (alone) flows in numbers, through an extruder, or duct 11, in the direction 13, per FIG. 1, a majority of such conventional rods will tend to align in the direction of flow with a lesser number of such rods being tilted off the direction of flow at various angles.

The invention however, provides a mixture of three types of rods 10, 12 & 14, described above, the orientation of which can be controlled as disclosed below.

That is, the components are mixed and the mixture is heated, if necessary, to attain a fluid state and then flowed through an extruder or duct 11 to the orientation stage 15, where a combination of magnetic, electric, and flow fields are applied, as indicated in FIGS. 2 & 3. Here the electrical field 16, magnetic field 18 and flow field 20 are at some well-defined angle in the range of 1 to 90 degrees. In one example, the flow field 20 of the mixture, can be visualized as coming up out of the plane of FIG. 2. The magnitude and direction of these fields is chosen so as to produce a desired distribution of molecular orientations within the sample of matter. This process is carried out in a region of phase space where the material exhibits molecular reorientational freedom, i.e., typically in the fluid phase.

Figure 5:
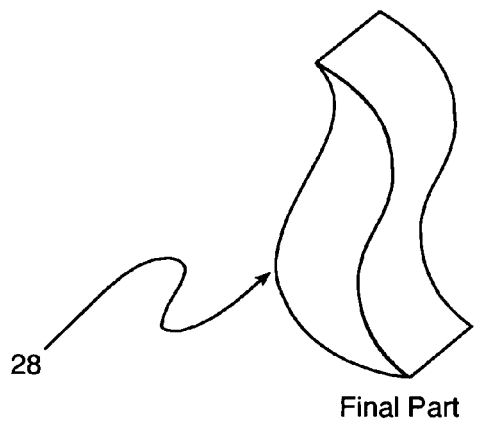
FIG. 5 is an isometric view of the polymeric product of FIG. 4 so made, with three dimensional strength, embodying the invention.

This process is carried out within a tool 22, as illustrated in FIG. 4, that is constructed from a non-magnetic, non-conducting material, such as ceramic, which facilitates the application of high electrical and magnetic fields. The tool can be fabricated from a material that is transparent to electromagnetic radiation, including that in the visible region, such that the polymeric material can be rapidly cross-linked, by photochemical reaction, to produce a mechanically stable detail component 24, when the tooling is separated along the split line 26, to yield a detail component with active and complex geometry and high dimensional tolerance 28, as shown in FIG. 5.

Thus it is known that long rod-like molecules can be used to produce polymeric fibers that have exceedingly high strength and stiffness in the longitudinal direction. These desirable macroscopic properties are a consequence of a high degree of intermolecular alignment along an axis parallel to the extrusion direction. Herein is disclosed a method of controlling molecular alignment of rod-like polymers in three dimensions. This enables the fabrication of detail structural components from a monolithic thermoplastic. In order to achieve this it is necessary to: (1) Synthesize rod-like polymers such as PBO or PBZT or related molecules, with well-defined length, (2) Activate the ends of these long rod-like molecules with tagants that increase their susceptibility to external fields such as magnetic or electric fields. This is done with an end-capping chemical reaction. (3) Formulate a mixture of untagged, magnetically tagged and electrically tagged polymers and (4) Flow this mixture through a ceramic forming tool across which mutually oriented electric and magnetic fields have been applied. The concept is indicated in FIG. 2.

Because the polymer backbone is identical in all three components there is no problem associated with mixing and blending. It can prove useful to include nanoparticles or other pseudo-spherical or dumbbell-like molecules to act as viscosity modifiers. The essential point is that the untagged molecules will orient in the direction of the flow field but the magnetically tagged particles will align in the direction of the magnetic field while the electrically tagged polymers will align in the direction of the electric field. By adjusting the flow rate, symmetries and intensities of these external fields it is possible to control the degree and direction of molecular alignment and entanglement of the rods, thus enabling the production of molded plastic components with the strength and stiffness resembling metals.

The basic idea is to provide a new kind of plastic that can be injection molded but has aluminum-like mechanical properties/high dimensional tolerance/highly integrated, to minimize bonding and joining operations and rapid manufacturing surge capability. That is, the method of the present invention enables one to develop a new class of monolithic structural polymer that is engineered such that it is injection-moldable and is formulated so that the three-dimensional orientational and translational (secondary and tertiary) structure can be controlled over mesoscopic distance scales. Thus it is possible to make detailed assemblies and major sub-assemblies at exceedingly low manufacturing costs.

That is, an advantage and new feature of the present invention, is that this new material allows fabrication of detail parts and assemblies with strikingly low manufacturing and assembly costs. Essentially it will allow components like automobile bodies or airframe assemblies or other vehicles and even structures, such as bridge or building components, to be molded using the same sorts of technologies that are currently used in toy manufacturing. With labor costs in the United States considerably higher than those in many other parts of the world this technology can play an important part in maintaining international competitiveness. The present invention will remove a large component of the labor cost associated with parts manufacturing and assembly and thereby provide a huge cost advantage.

The invention can be used by the government or industry in the production of a large number of detail components, sub-assemblies and major assemblies that are currently made out of metal or from advanced composite materials. Further, ubiquitous applications are seen including in automotive, aerospace and general engineering.

Accordingly, this invention teaches a new structure of matter and materials processing procedures that yield a polymeric material system with mechanical properties that are comparable to metals. The material and manufacturing process is unique in that detail components and major integrated assemblies and sub-assemblies can be manufactured using low cost techniques such as injection-molding. The components are of high strength and stiffness (approximately that of aluminum) but have low density and can be formed with high dimensional tolerance to near net shape. Because integrated components and highly active geometries can be made in a single operation, bonding and joining and related assembly costs are greatly reduced. This is achieved by chemically synthesizing a set of novel rigid and semi-rigid molecules that incorporate end-groups that make each individual molecule particularly susceptible to molecular alignment using an externally applied field such as an electric field, a magnetic field, or a flow field. For example, a rod-like polymer such as PBZT is synthesized to have a particular molecular weight and weight average distribution. As indicated above, the synthetic process is conducted so as to end-cap the rod-like polymer with a chemical moiety or moieties that are magnetically active, as alluded above, e.g., ferrocenyl or related derivatives. Using the same synthetic procedure, starting materials and the like, a second synthesis is conducted but in this case the final step is to end-cap the polymer with ionic or dipolar species, as noted above, that will impart susceptibility to external electric fields. A third synthesis is conducted to produce a polymer with no end-caps and which is not therefore particularly sensitive to externally applied electric or magnetic fields but will, by virtue of the rod-like stereochemistry, be susceptible to molecular alignment in a flow field. These materials are then blended in the presence of a viscosity modifier, such as nanoparticles, that enable the system to melt and flow at reasonably low temperatures. Then, as discussed above, the material is injection molded into a ceramic tool, while electric and magnetic fields are applied. This allows local control of molecular orientations and entanglement in three dimensions so as to produce high-strength parts.

What is claimed is:

1. A plastic article or structure having a 3-D orientation of polymeric rod molecules, comprising:
  (a) electrically susceptible tagants on only opposing ends of a first plurality of the polymeric rod molecules;
  (b) magnetically susceptible tagants on only opposing ends of a second plurality of the polymeric rod molecules; and,
  (c) a remaining plurality of the polymeric rod molecules not having electrically susceptible or magnetically susceptible tagants on opposing ends.

2. The plastic article of claim 1 wherein said molecules are in the form of polymeric rods that are magnetically tagged, electrically tagged and non tagged for said 3-D orientation in said flow fields.

* * * * *